United States Patent [19]

Baaten et al.

[11] Patent Number: 5,216,323
[45] Date of Patent: Jun. 1, 1993

[54] LOW-PRESSURE MERCURY VAPOR DISCHARGE LAMP FOR SUNTANNING PURPOSES

[75] Inventors: Johannes P. M. Baaten; Paulus A. M. Vermeulen, both of Roosendaal, Netherlands

[73] Assignee: U.S. Philips Corporation, New York, N.Y.

[21] Appl. No.: 865,800

[22] Filed: Apr. 7, 1992

Related U.S. Application Data

[63] Continuation of Ser. No. 653,830, Feb. 11, 1991, abandoned.

[30] Foreign Application Priority Data

Mar. 21, 1990 [NL] Netherlands ............ 9000657

[51] Int. Cl.$^5$ ............................................. H01J 61/48
[52] U.S. Cl. ................................................. 313/487
[58] Field of Search ........................ 313/488, 489, 487

[56] References Cited

U.S. PATENT DOCUMENTS

| | | | |
|---|---|---|---|
| 2,135,732 | 11/1938 | Randall et al. ................ | 313/488 |
| 4,336,479 | 6/1982 | Kodama et al. ............... | 313/488 X |
| 4,363,997 | 12/1982 | Kodama et al. ............... | 313/488 X |
| 4,859,903 | 8/1989 | Minematu et al. ............. | 313/487 |
| 4,959,551 | 9/1990 | Schlitt ........................... | 313/487 X |
| 4,967,090 | 10/1990 | Schlitt ........................... | 313/487 X |

FOREIGN PATENT DOCUMENTS 0228737 12/1986 European Pat. Off. .

Primary Examiner—Palmer C. Demeo
Attorney, Agent, or Firm—Brian J. Wieghaus

[57] ABSTRACT

Low-pressure mercury vapor discharge lamp for suntanning purposes comprising a tubular discharge vessel which is provided on the inside with a first luminescent layer comprising a first luminescent material which emits mainly UVA and with a second luminescent layer which comprises a second luminescent material which emits mainly UVA, the two luminescent materials also showing mutually different UVB emission contents. At least one of the two luminescent layers extends over only part of the circular circumference of the discharge vessel with the object of obtaining different quantities of UVB radiation emission in different transverse directions of the lamp. The luminescent material having the lowest UVB emission is disposed on the wall of the discharge vessel and absorbs a portion of the UVB emission from the other luminescent material which is disposed closest to the discharge and has the higher UVB emission.

12 Claims, 1 Drawing Sheet

LOW-PRESSURE MERCURY VAPOR DISCHARGE LAMP FOR SUNTANNING PURPOSES

This is a continuation of application Ser. No. 07/653,830, filed Feb. 11, 1991, now abandoned.

BACKGROUND OF THE INVENTION

The invention relates to a low-pressure mercury vapour discharge lamp for suntanning purposes comprising a closed tubular discharge vessel having an at least substantially circular cross-section, which discharge vessel contains mercury and a rare gas and is provided at the inside with a first luminescent layer which comprises a first luminescent material which emits mainly UVA and with a second luminescent layer which comprises a second luminescent material which emits mainly UVA, the first and second luminescent materials also showing UVB emission with mutually differing relative quantities of UVB radiation energy.

Such a lamp is known from the European Patent Application 0 228 737.

In the known lamp, a first luminescent layer is present over the entire circumference of the discharge vessel, which layer comprises lead-activated barium disilicate (BSP) or cerium-magnesium aluminate (CAM) as the luminescent material. A second luminescent layer is provided on the first luminescent layer at the discharge side and over the entire circumference of the discharge vessel, which second layer comprises europium-activated strontium metaborate (SBE) as the luminescent material.

The SBE has a relatively lower UVB emission (UVB energy calculated as a percentage of the quantity of UVA radiation energy emitted) than the BSP.

It is known that both UVA radiation (315–400 nm) and UVB radiation (280–315 nm) play an important part in the pigmentation process in the human skin. The main interest here concerns the process which is known as indirect or delayed pigmentation and which leads to a more permanent browning of the skin. UVB radiation is more effective for this process than is UVA radiation. A large dose of UVB radiation, however, is undesirable since it can lead to erythema (sunburn). Seen in this light, it is interesting to have available the possibility of adapting the UVB-radiation content to the wishes of the users.

In the known low-pressure mercury vapour discharge lamp mentioned above the UVB-radiation content is fixed. It is true that one could use two lamps of mutually differing UVB contents, but this means that extra provisions are necessary for switching the two lamps on and off separately. In solariums in which several lamps are present, moreover, this leads to a drop in the radiation level (W/m$^2$) since part of the lamps would then be switched off.

SUMMARY OF THE INVENTION

The invention has for its object to provide an improved low-pressure mercury vapour discharge lamp for suntanning purposes of which the dose of UVB radiation to be received by the user can be varied.

According to the invention, a low-pressure mercury vapour discharge lamp of the kind described in the opening paragraph is characterized in that at least one of the two luminescent layers extends only over a portion of the circular circumference of the discharge vessel.

Thus it is achieved in a simple and inexpensive manner that the user receives, in addition to the desired dose of UVA radiation, a variable dose of UVB radiation through rotation of the lamp about its longitudinal axis.

A favourable embodiment of a low-pressure mercury discharge lamp according to the invention is characterized in that the first luminescent layer extends through 180° or substantially 180° on the wall of the discharge vessel and the second luminescent layer extends through 360° on the first luminescent layer and on the wall of the discharge vessel.

In this embodiment, the first luminescent layer preferably comprises strontium tetraborate activated by bivalent europium as a first luminescent material, while the second luminescent layer preferably comprises barium disilicate activated by bivalent lead as a second luminescent material.

The two luminescent materials $SrB_4O_7:Eu^{2+}$ (SBE) and $BaSi_2O_5:Pb^{2+}$ (BSP) are known per se from the said European Patent Application 0 228 737. However, in the known lamp the BSP is present at the discharge vessel side and the SBE at the discharge side, whereas in the present case this is the other way about in the area where the two layers are both present, so that it is possible by rotation of the lamp to realise not only a sufficiently high dose of UVB radiation, but also a sufficient variation in the dosed quantity of UVB radiation in the direction of the user. This is because the BSP has a relatively stronger UVB emission than the SBE, while the SBE is found to absorb part of the UVB emission of the BSP where the BSP is present on the SBE.

Another favourable embodiment of a low-pressure mercury vapour discharge lamp according to the invention is characterized in that the two luminescent layers each extend through 180° of the circular circumference of the discharge vessel, adjoining one another on the wall of the discharge vessel.

A further favourable embodiment of a low-pressure mercury vapour discharge lamp according to the invention is characterized in that the first luminescent layer extends through 360° on the wall of the discharge vessel and the second luminescent layer extends through 180° or substantially 180° on the first luminescent layer.

BRIEF DESCRIPTION OF THE DRAWINGS

Embodiments of the lamp according to the invention will be explained with reference to a drawing.

In the drawing.

DESCRIPTION OF THE PREFERRED EMBODIMENTS

Figure 1A:
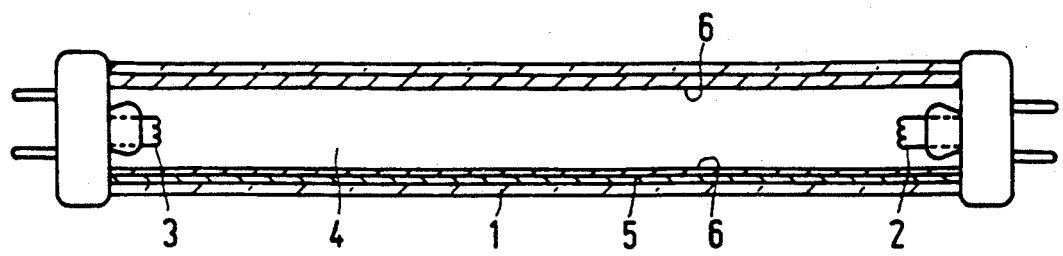
FIG. 1a shows a low-pressure mercury vapour discharge lamp in longitudinal section.
Figure 1B:
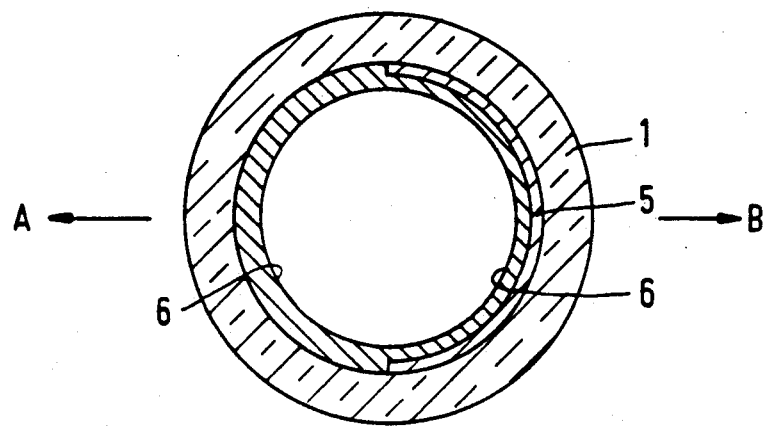
FIG. 1b shows the lamp of FIG. 1a in cross-section.

The low-pressure mercury vapour discharge lamp of FIG. 1a has a closed tubular glass discharge vessel 1 with a (FIG. 1b) circular cross-section. The discharge vessel contains mercury and a rare gas, for example argon, by way of starting gas. Inside the discharge vessel 1 are arranged electrodes 2 and 3 between which the discharge path 4 extends. The discharge vessel 1 is provided on its inside with a first luminescent layer 5 which extends through 180° (FIG. 1b) of the circular circumference of the discharge vessel 1 on the wall of this vessel. The discharge vessel 1 is further provided with a second luminescent layer 6 which extends through 360° (FIG. 1b) on the first luminescent layer 5 and on the wall of the discharge vessel 1. The luminescent layers 5 and 6 are provided in usual manner by means of a suspension.

The first luminescent layer 5 comprises a first luminescent material which generates mainly UVA emission and in addition some UVB emission upon excitation by mainly 254 nm radiation from the mercury discharge. The second luminescent layer 6 comprises a second luminescent material which also generates mainly UVA emission and in addition some UVB emission upon excitation by mainly 254 nm radiation from the mercury discharge. The relative UVB emission of the first luminescent material, i.e. the quantity of emitted UVB energy as a percentage of the quantity of UVA radiation emitted by this material, differs from that of the second luminescent material. As a result the quantity of UVB radiation energy emitted in the direction A (FIG. 1b) during lamp operation differs from the quantity emitted in the direction B. When the lamp is rotated about its longitudinal axis, therefore, a user positioned, for example, in the direction A is subjected to a varying dose of UVB radiation.

In a practical embodiment, a 100 W lamp was realised (lamp length 176 cm; bulb diameter 38 mm). The first luminescent layer 5 comprised strontium tetraborate activated by bivalent europium (SBE) as a first luminescent material. The powder weight was 3 g and the coating weight was 4.327 mg/cm$^2$. The quantity of UVA radiation emitted was 8.9 W, while the quantity of UVB radiation emitted was 0.12% of the quantity of UVA radiation emitted. The second luminescent layer comprised barium disilicate activated by bivalent lead (BSP) as a second luminescent material. The powder weight was 6 g and the coating weight was 3.055 mg/cm$^2$. The quantity of UVA radiation emitted was 16.2 W, while the quantity of UVB radiation emitted was 0.59% of the quantity of UVA radiation emitted. The UVB emission in the direction A of FIG. 1b, therefore, is greater than that in the direction B, the more so since it was found that part of the UVB radiation emitted by the luminescent layer 6 is absorbed by the luminescent layer 5 in the area where the layer 6 covers the layer 5.

Figure 2:
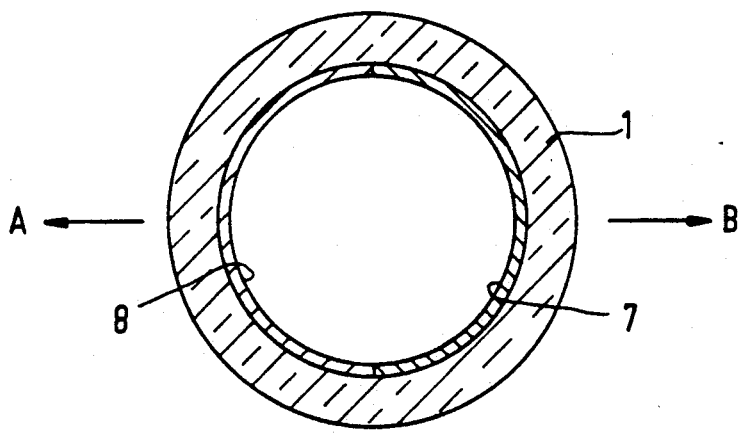
FIGS. 2 and 3 show alternative embodiments of lamps in cross-section.

In the lamp of FIG. 2, the first luminescent layer 7 and the second luminescent layer 8 each extend through 180° of the circular circumference of the discharge vessel adjoining one another on the wall of this vessel. The UVB emission content of the first luminescent material in the first luminescent layer 7 is different from that of the second luminescent material in the second luminescent layer 8. As a result, the quantities of UVB radiation emitted in the direction A and in the direction B are different.

Figure 3:
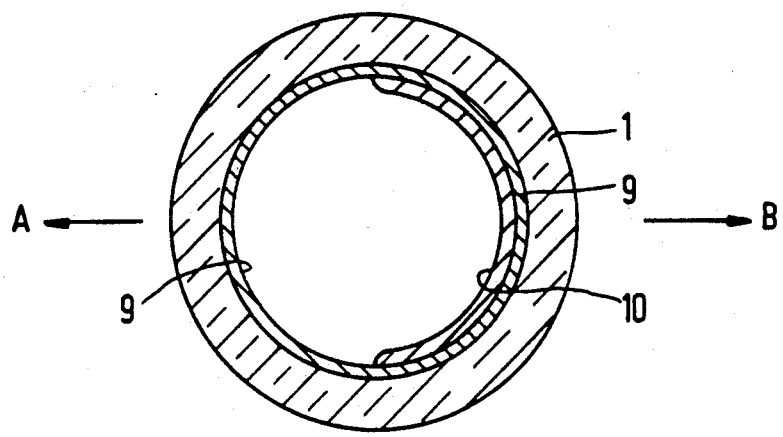

In the lamp of FIG. 3, the first luminescent layer 9 extends through 360° on the wall of the discharge vessel 1. The second luminescent layer 10 extends through 180° on the first luminescent layer 9. The quantity of UVB radiation emitted in the direction B is greater than in the direction A. Luminescent substances used for the lamps of FIGS. 2 and 3 may again be, for example, SBE and BSP.

We claim:

1. A low pressure mercury vapor discharge lamp for suntanning purposes, comprising:
a sealed transparent discharge vessel having a tubular inner wall;
a quantity of mercury and a rare gas within said discharge vessel;
means for maintaining a discharge within said discharge vessel during lamp operation;
a first luminescent layer within said discharge vessel which emits ultraviolet radiation in a first proportion of UVB to UVA radiation; and
a second luminescent layer within said discharge vessel which emits ultraviolet radiation in a second proportion of UVB to UVA radiation which is greater than said first proportion of said first layer, said resulting ultraviolet radiation being emitted from the entire circumferential surface of said discharge vessel,
said first layer being disposed on said inner wall of said discharge vessel and extending through a first circumferential portion of said discharge vessel and said second layer extending through a second circumferential portion of said discharge vessel, said second layer covering a predetermined substantial portion of said first layer and any circumferential portion of said inner wall of said discharge vessel not covered by said first layer, and
said first layer absorbing a quantity of the UVB radiation emitted by that portion of said second layer which covers said first layer such that the quantity of UVB radiation emitted by said circumferential portion having both of said first and second layers is different than said circumferential portion having only one of said first and second layers.

2. A low-pressure mercury vapour discharge lamp as claimed in claim 1, characterized in that said first luminescent layer extends circumferentially through 360° in contact with said inner wall of said discharge vessel and said second luminescent layer extends circumferentially through about 180° on said first luminescent layer.

3. A low-pressure mercury vapour discharge lamp as claimed in claim 2, wherein said first luminescent layer comprises strontium tetraborate activated by bivalent europium and said second luminescent layer comprises barium disilicate activated by bivalent lead.

4. A low-pressure mercury vapour discharge lamp as claimed in claim 1, wherein said first luminescent layer comprises strontium tetraborate activated by bivalent europium and said second luminescent layer comprises barium disilicate activated by bivalent lead.

5. A low-pressure mercury vapour discharge lamp according to claim 1, wherein said first luminescent layer extends through about 180° on the wall of said discharge vessel and said second luminescent layer extends through 360° on said first luminescent layer and on said wall of said discharge vessel.

6. A low-pressure mercury vapour discharge lamp according to claim 5, wherein said first luminescent layer comprises strontium tetraborate activated by bivalent europium and said second luminescent layer comprises barium disilicate activated by bivalent lead.

7. A low pressure mercury vapor discharge lamp for suntanning purposes, comprising:
a sealed transparent discharge vessel having a tubular inner wall;
a quantity of mercury and a rare gas within said discharge vessel;
means for maintaining a discharge within said discharge vessel during lamp operation;
a first luminescent layer within said discharge vessel which emits ultraviolet radiation in a first proportion of UVB to UVA radiation; and a second luminescent layer within said discharge vessel which emits ultraviolet radiation in a second proportion of UVB to UVA radiation which is greater than said first proportion of said first layer, said resulting ultraviolet radiation being emitted from the entire circumferential surface of said discharge vessel, said first layer being disposed on said inner wall of said discharge vessel and extending circumferentially through about 180° on said discharge vessel and said second layer being disposed on and covering all of said first layer and the other 180° circumferential portion of said discharge vessel not covered by said first layer, and said first layer absorbing a quantity of the UVB radiation emitted by that 180° portion of said second layer which covers said first layer such that the UVB radiation emitted from said circumferential portion covered only by said second luminescent layer is greater than the UVB radiation emitted from said circumferential portion covered by both of said first and second luminescent layers.

8. A low-pressure mercury vapor discharge lamp according to claim 7, wherein said first luminescent layer comprises strontium tetraborate activated by bivalent europium and said second luminescent layer comprises barium disilicate activated by bivalent lead.

9. A low pressure discharge lamp according to claim 8, wherein the thickness of said second luminescent layer on the 180° circumferential portion not covered by said first layer equals the combined thickness of the said first and second layers on said circumferential portion having both of said layers.

10. A low pressure discharge lamp according to claim 7, wherein the thickness of said second luminescent layer on the 180° circumferential portion not covered by said first layer equals the combined thickness of the said first and second layers on said circumferential portion having both of said layers.

11. A low pressure mercury vapor discharge lamp for suntanning purposes, comprising:
- a sealed transparent discharge vessel having a tubular inner wall;
- a quantity of mercury and a rare gas within said discharge vessel;
- means for maintaining a discharge within said discharge vessel during lamp operation;
- a first luminescent layer within said discharge vessel which emits ultraviolet radiation in a first proportion of UVB to UVA radiation; and
- a second luminescent layer within said discharge vessel which emits ultraviolet radiation in a second proportion of UVB to UVA radiation which is greater than said first proportion of said first layer,
- said resulting ultraviolet radiation being emitted from the entire circumferential surface of said discharge vessel,
- said first layer being disposed on and covering all of said inner wall of said discharge vessel with a uniform layer thickness and said second layer being disposed on said first layer and circumferentially extending through about 180° thereon, and
- said UVB emission from said 180° portion of said second layer covering said first layer adding to the quantity of the UVB radiation emitted by said covered portion of said first layer such that the UVB radiation emitted from said circumferential portion covered only by said first layer is less than the UVB radiation emitted from said circumferential portion covered by both of said first and second luminescent layers.

12. A low-pressure mercury vapor discharge lamp according to claim 11, wherein said first luminescent layer comprises strontium tetraborate activated by bivalent europium and said second luminescent layer comprises barium disilicate activated by bivalent lead.

* * * * *